United States Patent [19]

Mederer et al.

[11] Patent Number: 5,196,967
[45] Date of Patent: Mar. 23, 1993

[54] METHOD OF AUTOMATICALLY OPTIMIZING THE RECORDING BIAS FOR A VIDEO SIGNAL, AND ARRANGEMENT FOR CARRYING OUT THE METHOD

[75] Inventors: Werner Mederer, Lauf/Peg; Ulrich Grothaus, Puschendorf; Karl Singer, Reichenschwand, all of Fed. Rep. of Germany

[73] Assignee: Grundig E.M.V. Elektro-Mechanische Versuchsanstalt Max Grundig holland Shiftung & Co., Furth/Bay, Fed. Rep. of Germany

[21] Appl. No.: 599,338

[22] Filed: Oct. 17, 1990

Related U.S. Application Data

[63] Continuation-in-part of Ser. No. 268,112, Nov. 7, 1988.

[30] Foreign Application Priority Data

Nov. 19, 1987 [DE] Fed. Rep. of Germany ....... 3739180

[51] Int. Cl.$^5$ .......................... G11B 5/02; G11B 5/03
[52] U.S. Cl. ........................................ 360/66; 360/67; 360/65
[58] Field of Search ............ 360/19.1, 33.1, 66, 360/27, 25, 60, 28, 31, 65, 67, 68; 358/335, 343, 310; 369/47, 48, 53

[56] References Cited

U.S. PATENT DOCUMENTS

| | | | |
|---|---|---|---|
| 4,220,979 | 9/1980 | Kitamura et al. | 360/66 |
| 4,253,122 | 2/1981 | Tabata | 360/31 |
| 4,279,005 | 7/1981 | Kitamura et al. | 360/31 |
| 4,295,168 | 10/1981 | Muller | 360/66 |
| 4,325,088 | 4/1982 | Wright | 360/66 |
| 4,338,639 | 7/1982 | Fujibayashi | 360/66 |
| 4,352,130 | 9/1982 | Hasegawa et al. | 360/66 |
| 4,553,179 | 11/1985 | Inami et al. | 360/66 |
| 4,688,110 | 8/1987 | Fricke | 358/343 |
| 4,764,915 | 8/1988 | Efron et al. | 369/58 |
| 5,027,229 | 6/1991 | Suwa et al. | 360/19.1 |

FOREIGN PATENT DOCUMENTS

56-163505 12/1981 Japan ..................... 360/66

Primary Examiner—Aristotelis Psitos
Assistant Examiner—Varsha V. Sheladia
Attorney, Agent, or Firm—Edward W. Goodman

[57] ABSTRACT

In recording systems in which video and audio signals are recorded in tape layers having different depths, a method and apparatus is provided which serves to ensure that the video recording bias for a video signal is always selected and adjusted for optimum results, allowance being made for an audio signal already recorded in the same tracks and for tolerances of the record carrier, the heads and the head amplifier with respect to the playback sensitivity. During recording of the video signal, the video recording bias is varied stepwise. After every change in the video recording bias, a d.c. signal is derived from the playback envelope of the audio signal, the value of the d.c. signal being a measure of the playback amplitude of the audio signal. As soon as the d.c. signal value has reached a predetermined minimum value, the video recording bias is ceased to be changed and the last value of the video recording bias is stored for the next recording process.

6 Claims, 3 Drawing Sheets

METHOD OF AUTOMATICALLY OPTIMIZING THE RECORDING BIAS FOR A VIDEO SIGNAL, AND ARRANGEMENT FOR CARRYING OUT THE METHOD

CROSS-REFERENCE TO RELATED APPLICATIONS

This is a continuation-in-part of co-pending patent application Ser. No. 268,112, filed Nov. 7, 1988.

BACKGROUND OF THE INVENTION

1. Field of the Invention

The invention relates to a method of automatically optimizing the video recording bias for a video signal recorded in the same tracks as an audio signal, the audio signal being stored in the deeper layers of the record carrier in a first recording step and the video signal being stored in the upper layers of said record carrier in a second recording step. The invention also relates to an arrangement for carrying out the method.

2. Description of Related Art

"Grundich Technische Informationen", Feb. 3, 1985, pp. 63–98, describes a video recorder operating in accordance with the "multi-layer recording method". This recording method is realized by arranging the audio heads approximately 90° before the video heads on a head disc. During recording, the audio track is first recorded in a "deep" layer of the magnetic tape. The audio signal is subsequently overwritten at the tape surface by the following video head. The video recording bias should now be selected in such a way that the (frequency-modulated) audio signal already recorded is not attenuated excessively. The constant video recording bias to be adjusted during final adjustment of the video recorder may therefore be only so large as to ensure that the audio signal is not attenuated too strongly, allowance being made for different types of tape and other tolerances in the recording system. Consequently, the picture information is not always recorded with an optimum video recording bias.

German Offenlegungsschrift 27 58 307 reveals a method of automatically optimizing the video recording bias for a video signal. For this purpose, the video recording bias is increased preferably linearly, the playback signal is differentiated and for a selected gradient of the playback signal, the value of the video recording bias is determined and stored. However, this method exclusively relates to the optimization of the video recording without any attention being paid to the associated audio recording.

SUMMARY OF THE INVENTION

It is an object of the invention to provide a method of automatically optimizing the video recording bias for a video signal recorded in the same tracks as an audio signal, the audio signal being stored in the deeper layers of the record carrier in a first recording step and the video signal being stored in the upper layers of said record carrier in a second recording step, as well as an arrangement for carrying out the method, such that the video recording bias for the video signal is always selected and adjusted for optimum results, taking into account the audio signal already recorded and tolerances of the record carrier, the heads and the head amplifier with respect to the playback sensitivity.

According to the invention, this object is achieved by means of the steps, during recording of the video signal, the video recording bias for said video signal is changed step-wise, in that after every change of the video recording bias, a d.c. signal value is derived from the playback envelope of the audio signal as a measure of the playback amplitude of the audio signal, and in that the video recording bias ceases to be changed and its last value is stored as soon as the d.c. signal value derived from the playback envelope of the audio signal has decreased to a predetermined minimum value.

In a first method in accordance with the invention, the video recording bias for the video signal is changed step-wise during recording of said video signal. After every change of the video recording bias for the video signal, the record carrier is rewound and a d.c. signal value is derived from the playback envelope of the audio signal as a measure of the playback amplitude of the audio signal. As soon as the d.c. signal value derived from the playback envelope of the audio signal has decreased to a predetermined minimum value, the video recording bias is not changed any further. The last setting of the video recording bias is then stored for the remainder of the recording process.

In a second method in accordance with the invention, the video recording bias for the video signal is changed step-wise between a predetermined minimum and a predetermined maximum value during recording of said video signal. At the same time, the change in the video recording bias as a function of time is stored. After recording of the video signal, the record carrier is rewound to the beginning of the recording. During a subsequent playback process, a corresponding time-dependent d.c. variation is derived from the playback envelope of the audio signal as a measure of the audio signal playback amplitude which is dependent on the video recording bias. The optimum video recording bias corresponding to a predetermined minimum value of the audio signal can then be derived from the d.c. variation of the reproduced audio signal and from the stored change in video recording bias as a function of time, after which said optimum video recording bias can be stored.

The two methods in accordance with the invention have the advantage that they always determine the optimum value for the video recording bias, i.e., for a just acceptable attenuation of the audio signal (to the predetermined minimum value) already recorded in the same track.

Preferably, the adjustment process for the video recording bias is carried out every time that a new recording is to be made and/or a tape is changed. This always ensures a video and audio recording of optimum quality, regardless of the type of tape.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
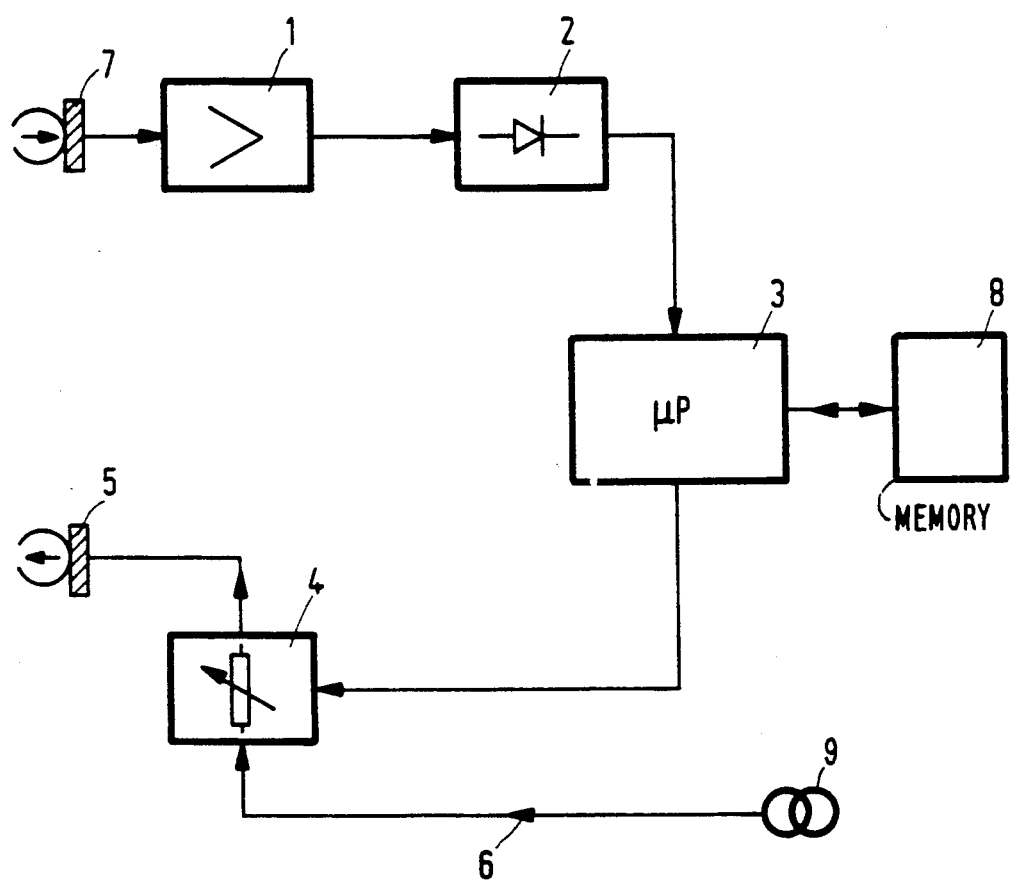
FIG. 1 is a block schematic diagram of an arrangement incorporating the subject invention.

The playback channel for the audio signal scanned by the audio heads 7 comprises an amplifier device 1 and a detector device 2, by means of which a d.c. signal is derived from the audio signal scanned, the value of this d.c. signal being a measure of the playback amplitude of the audio signal. This d.c. signal is applied to a calculation unit 3. In order to carry out the method in accordance the first embodiment of the invention, this calculation unit 3 also controls the tape-transport system (not shown) of the video recorder and the alternate recording and playback cycles of the audio and video heads 7 and 5 in such a way that the audio signal, which was recorded by the audio heads 7 and overwritten by the video heads 5 in a first cycle, is read in a second cycle in order to produce or not produce a change of the video recording bias depending on the playback amplitude of the audio signal. In order to change or adjust the video recording bias, the recording channel for the video signal comprises an electronic control element 4 via which the video recording bias 6, from a video recording bias generator 9, for the video heads 5 can be changed or adjusted under control of the calculation unit 3 depending on the value of the d.c. signal derived from the playback amplitude of the audio signal. The calculation unit 3 is further coupled to a memory 8, which stores intermediate values required for the adjustment process and the optimum control value for controlling the electronic control element 4, this optimum value being determined during the adjustment process.

Figure 2:
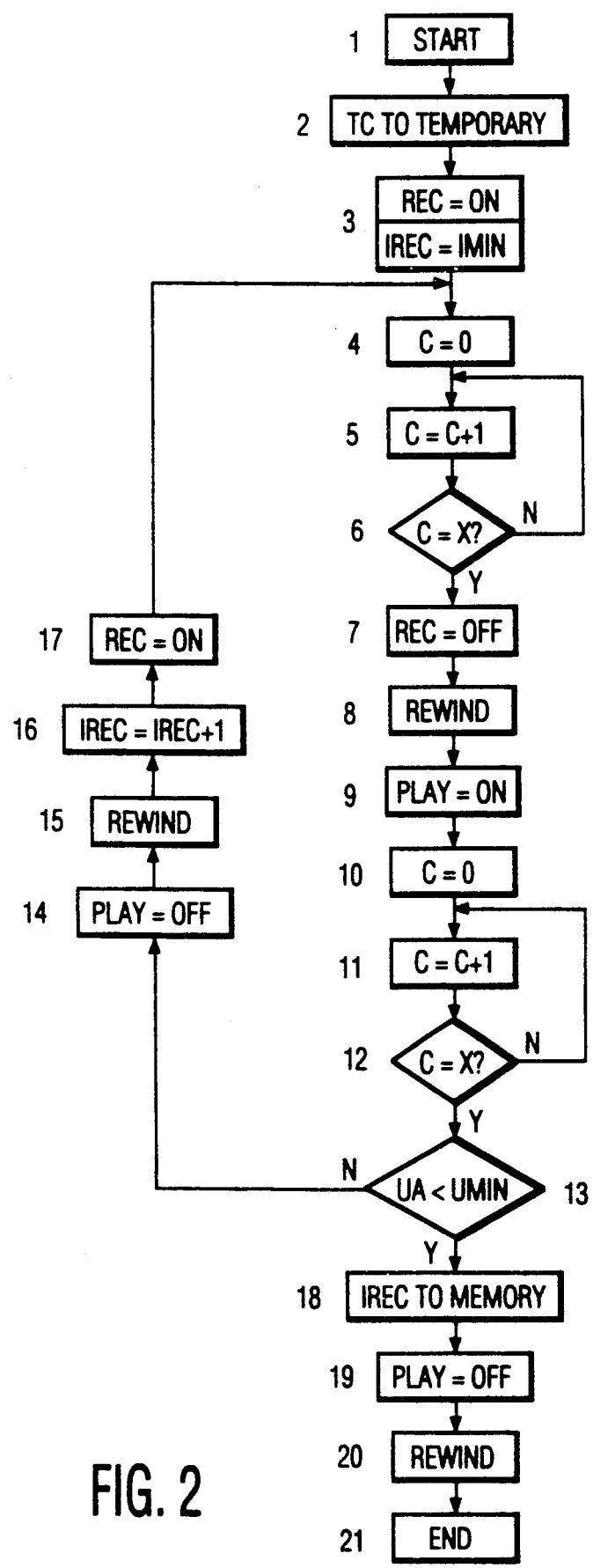
FIG. 2 is a flowchart showing the programming of the microprocessor for a first embodiment of the invention.

FIG. 2 is a flowchart illustrating the method of a first embodiment of the invention carried out by the calculation unit 3, which is preferably a microcomputer. After the start of the process (step 1), the instantaneous count of a tape-transport counter (not shown) is stored in the memory 8 (step 2). A recording process is then started and at the same time, the video recording bias is set to a predetermined minimum value (step 3). In the next step, a counter is set to zero (step 4). The count of this counter is incremented until it has reached a given value x (steps 5 and 6). This value x is selected, for example, in such a way that the time during which recording with the instantaneously chosen recording bias is effected, is of the order of a few seconds. This time depends specifically on the acceleration and deceleration times of the tape-drive motor of the video recorder. In the next step, the recording process is terminated (step 7) and the tape is rewound to a point corresponding to the stored count of the tape-transport counter (step 8). Subsequently, the reproducing process is started (step 9) and the counter is again set to zero (step 10). The count of the counter is now incremented until it has reached the given value x (steps 11 and 12). Once this count is reached, the microcomputer 3 reads the d.c. signal from the output of the detector 2, this d.c. signal having been derived from the playback envelope of the audio signal and the value of this d.c. signal being a measure of the playback amplitude of the audio signal, and checks whether the value of this d.c. signal has decreased to predetermined minimum value (step 13). If this is not the case, the reproduction process is stopped (step 14), the tape is rewound to a point corresponding to the count of the tape-transport counter stored in the memory 8 (step 15), the video recording bias is incremented by one step (step 16), and the recording process is re-started (step 17). These steps 4–17 are repeated until the value of the d.c. signal, derived from the reproduced audio signal, has decreased to the predetermined minimum value. If this is the case for a specific value of the video recording bias, this specific value of the video recording bias is stored in the memory 8 (step 18). After this, the playback process is stopped (step 19) and the tape is rewound (step 20), which terminates the described process (step 21). After termination of this process, the value of the optimum video recording bias for the video signal has thus been determined and stored and is available for the recording process. The value of the optimum video recording bias corresponds to a digital number which is employed as a control value for the electronic control element 4. This electronic control element 4 comprises, for example, a plurality of parallel resistors, which can be switched into and out of the signal path (depending on the control value) to provide the desired video recording bias value.

Figure 3:
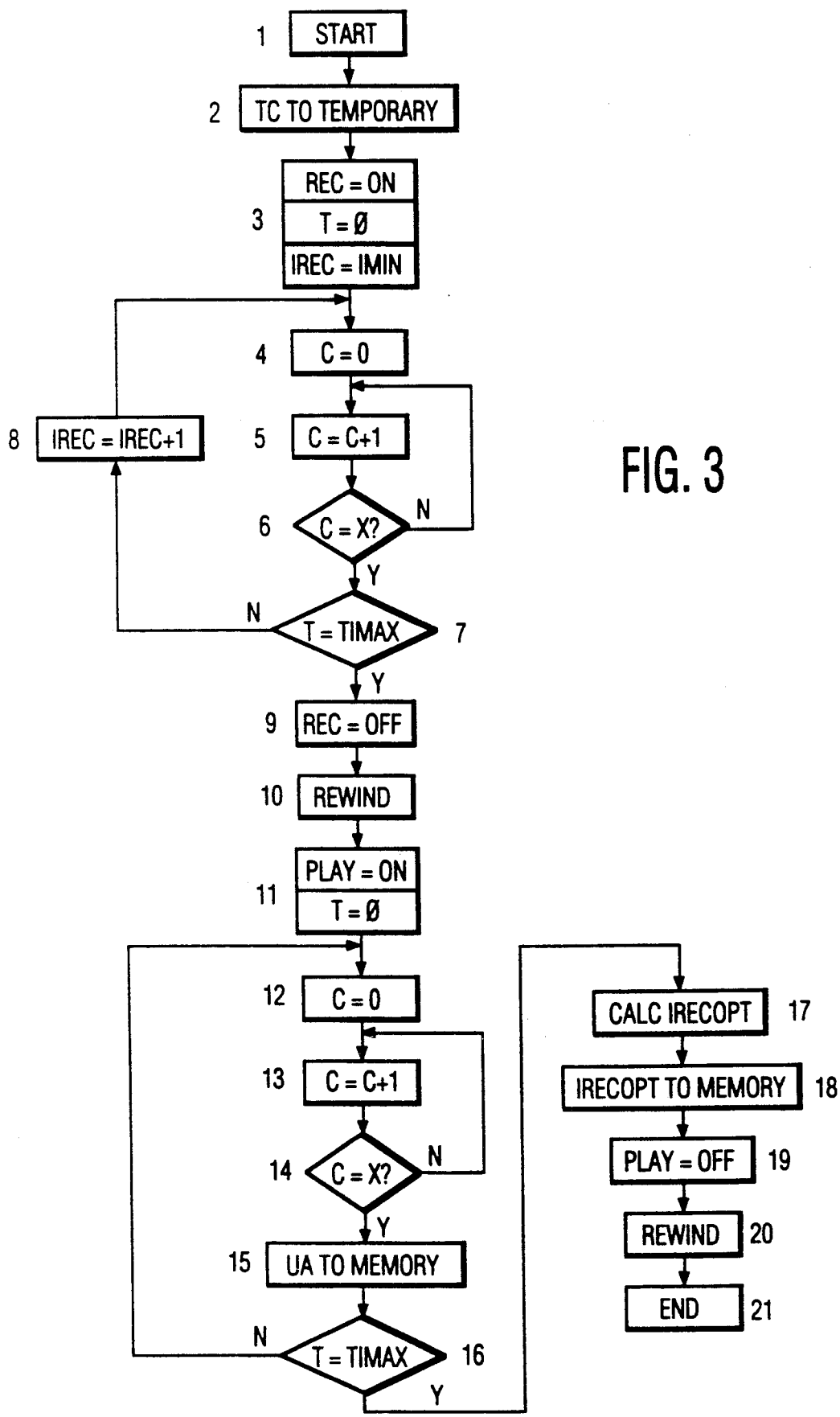
FIG. 3 is a flowchart showing the programming of the microprocessor for a second embodiment of the invention.

FIG. 3 is a flowchart illustrating the method of the second embodiment of the invention carried out by the calculation unit 3, which is preferably a microcomputer. After the start of the process (step 1), the instantaneous count of the tape-transport counter is stored in the memory (step 2). A recording process is then started, a time counter is set to zero and the video recording bias is set to a predetermined minimum value (step 3). In the next step, a further counter is set to zero (step 4). The count of this further counter is incremented until it has reached a predetermined value x (steps 5 and 6). This value x is selected, for example, in such a way that the time during which recording with the instantaneously chosen recording bias is effected, is of the order of a few seconds. This time depends specifically on the acceleration and deceleration times of the tape-drive motor of the video recorder. In the next step, it is ascertained whether the time which has elapsed, as indicated by the time counter, since process step 3 corresponds to the time needed to traverse all of the video recording bias steps, for example 8 (step 7). If this is not yet the case, the video recording bias is incremented by one step (step 8). The steps 4–8 are repeated until all of the video recording bias steps have been traversed. If the comparison effected in the step 7 yields a positive result, the recording process is terminated (step 9) and the tape is rewound to a point corresponding to the count of the tape-transport counter stored in the memory 8 (step 10). Subsequently, a reproducing process is started and the time counter is reset to zero (step 11) and the further counter is set to zero (step 12). The count of this further counter is now incremented until it has reached the predetermined value x (steps 13 and 14). Once this count is reached, the microcomputer reads a d.c. signal from the output of the detector 2, this d.c. signal having been derived from the playback envelope of the audio signal and the value of this d.c. signal being a measure of the playback amplitude of the audio signal. The value of this d.c. signal is stored in the memory 8 (step 15). In the next step, the time counter is checked to determine whether the time elapsed since the process step 11 corresponds to the time needed to traverse all of the video recording bias steps (step 16). If this is not the case, the process steps 12–16 are repeated until the time comparison in step 16 yields a positive result. Subsequently, in step 17, the stored d.c. signal values are processed to determine the optimum d.c. signal value (step 17), and the corresponding video recording bias for the video signal is stored in the memory 8 (step 18). The reproduction process is now stopped (step 19) and the tape is rewound (step 20), which terminates the described process (step 21). After termination of this process, the value of the optimum video recording bias for the video signal has thus been determined and stored and is available for the recording process. The value of the optimum video recording bias corresponds to a digital number, which is employed as a control value for the electronic control element 4.

Numerous alterations of the structure herein disclosed will suggest themselves to those skilled in the art. However, it is to be understood that the disclosed embodiments are for purposes of illustration only and are not meant to be a limitation of the invention. All such modification which do not depart from the spirit of the invention are intended to be included within the scope of the appended claims.

We claim:

1. A method of automatically optimizing the video recording bias for a video signal recorded in the same tracks of a record carrier as an audio signal, the audio signal having been recorded in deeper layers of the record carrier in a first recording step followed by the video signal being recorded in upper layers of said record carrier in a second recording step, wherein during recording of said video signal, said method comprises the steps:

changing, step-wise, the video recording bias during the recording of said video signal;

after every change of said video recording bias, deriving a d.c. signal from a playback envelope of the audio signal, a value of said d.c. signal being a measure of the playback amplitude of the audio signal;

comparing said d.c. signal value to a predetermined minimum value; and terminating the changing of said video recording bias and storing the value of said video recording bias when said d.c. signal value has decreased to said predetermined minimum value.

2. A method of automatically optimizing a video recording bias for a video signal recorded in the same tracks of a record carrier as an audio signal, the audio signal being recorded in deeper layers of the record carrier in a first recording step and the video signal being recorded in upper layers of said record carrier in a second recording step, characterized in that during recording of the video signal, the method comprises the steps:

changing, step-wise, the video recording bias for said video signal between a predetermined minimum value and a predetermined maximum value;

storing the change in said video recording bias as a function of time;

rewinding said record carrier to the beginning of said recording after recording with said maximum value of said video recording bias is effected;

deriving a time-dependent d.c. variation from the playback envelope of the audio signal as a measure of the audio signal playback amplitude which is dependent on the video recording bias;

comparing said time-dependent d.c. variation with a predetermined minimum value; and storing the video recording bias corresponding to the time-dependent d.c. variation when said time-dependent d.c. variation decreases to said predetermined minimum value.

3. A method as claimed in claim 1 or 2, characterized in that said method is carried out every time a new recording is to be made and/or every time a record carrier is changed.

4. An arrangement in a video recorder for automatically optimizing the video recording bias for a video signal recorded in the same tracks of a record carrier as an audio signal, the audio signal having been recorded in deeper layers of the record carrier in a first recording step followed by the video signal being recorded in upper layers of said record carrier in a second recording step, characterized in that said arrangement comprises:

means for changing, step-wise, the video recording bias during the recording of said video signal;

means for deriving, after every change of said video recording bias, a d.c. signal from a playback envelope of the audio signal, a value of said d.c. signal being a measure of the playback amplitude of the audio signal;

means for establishing a predetermined minimum value;

means for comparing said d.c. signal value to said predetermined minimum value; and means for terminating the changing of said video recording bias and for storing the value of said video recording bias when said d.c. signal value has decreased to said predetermined minimum value.

5. An arrangement in a video recorder for automatically optimizing a video recording bias for a video signal recorded in the same tracks of a record carrier as an audio signal, the audio signal having been recorded in deeper layers of the record carrier in a first recording step followed by the video signal being recorded in upper layers of said record carrier in a second recording step, characterized in that said arrangement comprises:

means for changing, step-wise, the video recording bias during the recording of said video signal between a predetermined minimum limit value and a predetermined maximum limit value;

means for storing the change in said video recording bias as a function of time;

means for rewinding said record carrier to the beginning of said recording after recording with said maximum limit value of said video recording bias has been effected;

means for deriving a time-dependent d.c. variation from the playback envelope of the audio signal as a measure of the audio signal playback amplitude which is dependent on the video recording bias;

means for establishing a predetermined minimum value;

means for comparing said time-dependent d.c. variation with said predetermined minimum value; and means for storing the video recording bias corresponding to the time-dependent d.c. variation when said time-dependent d.c. variation decreases to said predetermined minimum value.

6. An arrangement as claimed in claim 4 or 5, characterized in that said video recorder comprises a record carrier transport system having a transport counter, and video heads and audio heads, and said arrangement comprises:

an amplifier and a detector coupled to said audio heads for generating said d.c. signal;

a video recording bias generating circuit for generating said video recording bias;

an electronic control element coupled to an output of said video recording bias generating circuit for controlling the value of said video recording bias, said electronic control element having a control signal input;
a calculation unit for receiving said d.c. signal and for comparing the value of said d.c. signal to said predetermined minimum value, said calculation unit also generating said control signal for said electronic control element; and
a memory for storing said predetermined minimum value, said optimum video recording bias, and a value of said transport counter.

* * * * *